June 30, 1931.  V. G. APPLE  1,811,836
COMBINED STARTING AND PUMPING SYSTEM FOR MOTOR VEHICLES
Filed Jan. 30, 1929  2 Sheets-Sheet 2
Fig. 2.
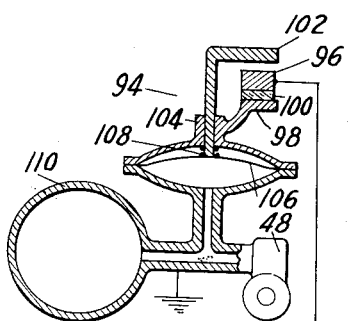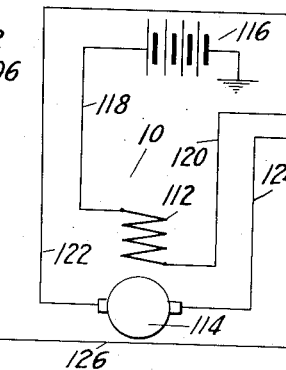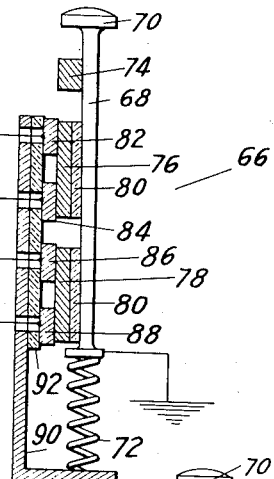
Fig. 3.
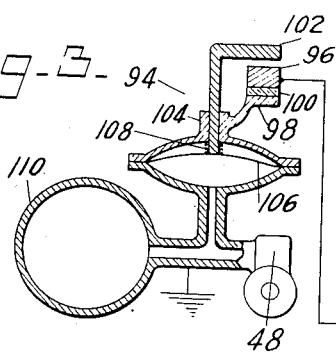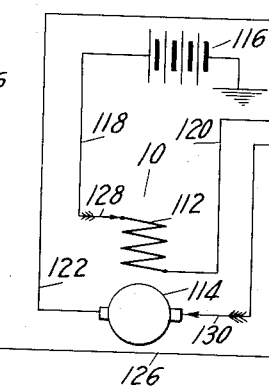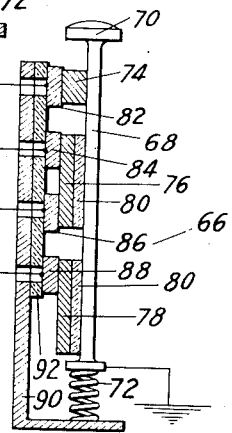
Fig. 4.
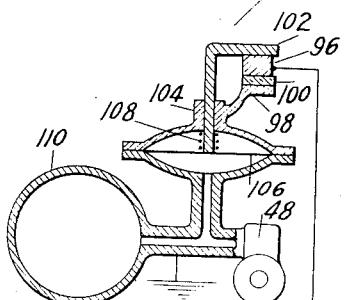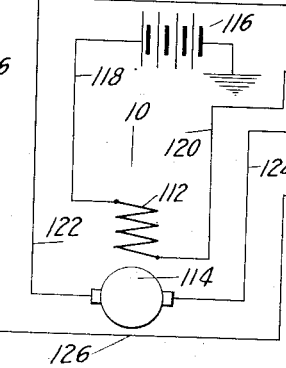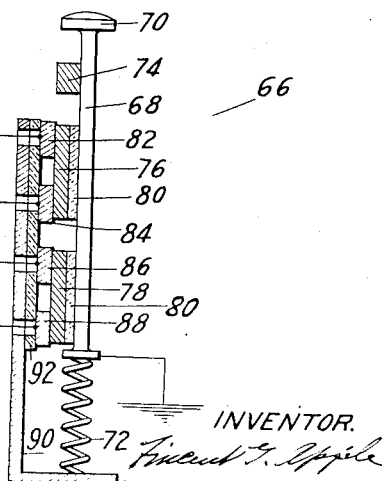
INVENTOR.
Vincent G. Apple
Burton & McConkey
Attorneys Patented June 30, 1931

1,811,836

UNITED STATES PATENT OFFICE

VINCENT G. APPLE, OF DAYTON, OHIO, ASSIGNOR TO BENDIX BRAKE COMPANY, OF SOUTH BEND, INDIANA, A CORPORATION OF ILLINOIS

COMBINED STARTING AND PUMPING SYSTEM FOR MOTOR VEHICLES

Application filed January 30, 1929. Serial No. 336,300.

This invention relates to a combined starting and pumping system and particularly to improved control means therefor, and is primarily adapted to automotive use.

One object of the invention is to so combine a starting and a pumping system as to be able to use the same electric motor to operate both.

Another object is the provision of suitable control mechanism for an electric starting motor whereby when the motor is running in one direction it is usable for starting and when it is running in the other direction it is usable for pumping, and means are associated therewith for automatically coupling the motor with the engine to start the engine or with a suitable pump to drive the pump.

A meritorious feature of the combination resides in the inclusion of the motor in an electric circuit provided with a pair of switches one of which is operable to make the circuit through the motor for use as a pumping motor. The starting motor switch is operable at all times to make the circuit through the motor for starting irrespective of the position of the other switch but said other switch is operable to make the circuit through the motor for pumping only when the starting switch is in a given position.

Other objects, advantages and desirable features of my invention will more fully appear from the following specification, appended claims and accompanying drawings, wherein:

Fig. 2 is a schematic illustration of the electric circuit and of its controls when entirely inoperative.

Fig. 3 is a similar illustration of the same elements except that the controls are in position for starting.

Fig. 4 shows the controls in position for compressing the air for braking.

Similar numerals refer to similar parts throughout the several views.

Figure 1:
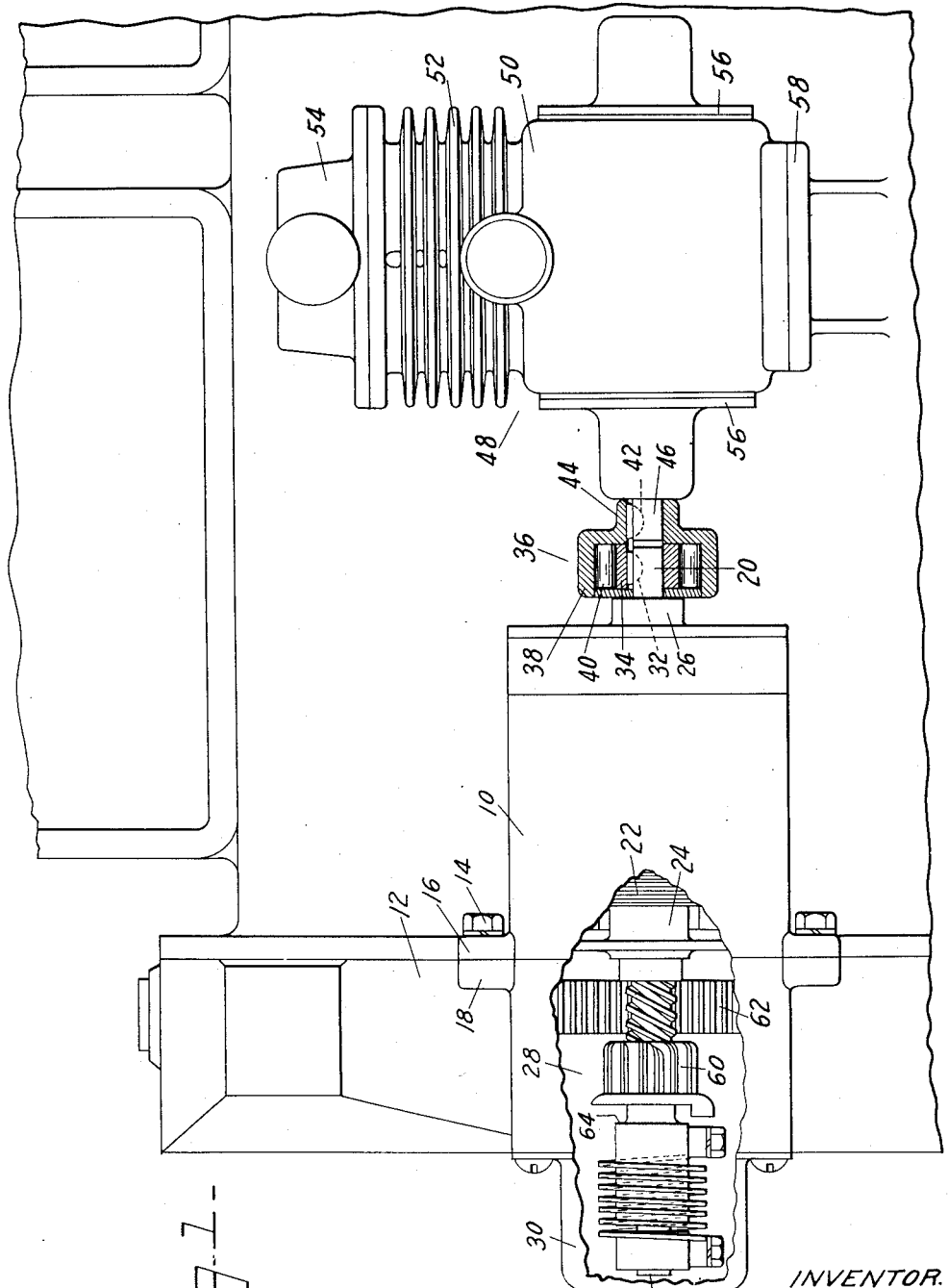
Fig. 1 shows an electric motor having means at one end to engage and start an automotive engine and at the other end to engage and operate an air compressor.

In the drawing the motor 10 is secured to the engine flywheel housing 12 by screws 14 passing through ears 16 into housing ears 18.

The shaft 20 of armature 22 has rotative bearing at the one end in hub 24 and at the other end in hub 26.

A Bendix starter drive 28 is secured in the usual manner to shaft 20 where it extends beyond hub 24, and a cap 30 covers the end of the drive which extends through and beyond the housing 12.

At the other end of the motor the shaft 20 extends from the hub 26 and is keyed at 32 to drive the hub 34 of an overrunning clutch 36. The outer clutch ring 38 surrounds the hub and rollers 40 to fill the space between the hub and the ring as in common practice.

A key 42 in the hub 44 of ring 38 secures said ring to the shaft 46 of compressor 48 which is of substantially standard construction and comprises a crank chamber 50 and twin cylinders 52 en bloc, with cylinder head 54 and crank bearing heads 56 appropriately secured thereto. The compressor is fastened to a bracket 58 which is part of the crank case of the engine.

In order to enable the motor 10 to operate the Bendix drive in starting, and afterward the compressor to charge a tank with compressed air for operating air brakes or similar appliances, provision is made to revolve the motor shaft in opposite directions. By so doing the starting pinion 60 is moved axially into engagement with flywheel gear 62 in the usual manner for starting, but is urged toward shoulder 64 when the motor revolves in the other direction for compressing. The camming surfaces of the hub 34 of clutch 36 are so cut that while the motor 10 runs in the starting direction the pump shaft 46 is stationary, but when the motor runs oppositely to its starting direction shaft 46 is revolved and air is compressed.

In order to have the motor 10 revolve in one direction when starting, and in the other direction only whenever the pressure in a storage tank is sufficiently reduced to require compressing, appropriate circuit controls must be provided. In Figs. 2, 3 and 4 a system of such controls is schematically shown, Fig. 2 showing the setting of the controls when neither starting nor compressing is taking place, Fig. 3 when starting is taking place, and Fig. 4 when compressing is taking place.

To make the system effective without more attention than must be given the ordinary starting system, the starting switch is so constructed that downward pressure thereon makes all necessary connections to revolve the motor in proper starting direction, while its release, without more, makes such connections as will revolve the motor oppositely whenever a suitable pressure operated switch is automatically closed.

Referring to Figs. 2, 3 and 4, the starting switch 66 has a stem 68 adapted to be downwardly depressed by the application of foot pressure to tread 70 and to be returned by the upward pressure of spring 72. A short contact member 74 is secured to and in electrical contact with stem 68. Two longer contact members 76 and 78 are secured to but electrically insulated from the stem by pads 80 of insulating material. Contacts 82, 84, 86 and 88 are secured to the switch frame 90 and are insulated from each other and from the frame by insulating strip 92.

Working in conjunction with the manually operable switch 66 is an automatic switch 94 which comprises a stationary contact member 96 insulated from frame 98 by insulating strip 100 and a cooperating contact member 102 vertically operable in hub 104 by the pressure diaphragm 106 to break the circuit, and downwardly operable by spring 108 to close the circuit.

Whenever the pump 48 has been operated by the motor 10 until the pressure in tank 110 is sufficiently high to raise diaphragm 106 against the resistance of spring 108, the automatic switch 94 is open and, when sufficient air is drawn from tank 110 to permit spring 108 to expand, the switch 94 is closed.

Figs. 2, 3 and 4 show the motor 10 diagrammatically, 112 being the field coil and 114 the armature. A battery 116 supplies the electric current. One terminal of the battery is grounded while the other is connected by wire 118 to one end of the field winding 112, the other end of the field winding being connected to terminal 84 by wire 120. Wires 122 and 124 connect armature 114 to terminals 82 and 86 respectively and an additional wire 126 connects terminal 96 of automatic switch 94 to terminal 88. Stem 68 and tank 110 are grounded.

Fig. 2 shows pedal tread 70 of switch 66 in the raised inoperative position and automatic switch 94 open. By inspection it will be seen that no circuit is made and consequently no current may flow with the switches in this position.

Fig. 3 shows the mechanism with tread 70 of switch 66 depressed to starting position. By tracing the circuit it will be seen that current may flow from battery 116 through the field in the direction of arrow 128 and through the armature in the direction of arrow 130. No current flows in wire 126, nor would it flow at this time even if a reduction in pressure permitted switch 94 to close.

In Fig. 4 the starting switch 66 is returned to its normal inoperative position and the pressure in tank 110 has been reduced sufficiently to permit automatic switch 94 to be closed by joining contacts 96 and 102. In this position current passes from battery 116 through field coil 112 in the same direction as in Fig. 2 but through the armature 114 oppositely. The motor then revolves opposite to its starting direction as long as switch 94 remains closed, unless starting is required before switch 94 opens, in which case starting may be effected by merely depressing pedal tread 70 as before.

From the foregoing description it is apparent that with my improved system installed air for operating brakes or other purposes may be compressed with the same motor as is used for starting the engine and with no more attention than is required in the ordinary starting system.

What I claim is:

1. Automotive apparatus comprising, in combination, an internal combustion engine, an electric circuit including an electric motor, a pump, means automatically responsive to the rotation of the motor in the one direction to connect the motor to the engine for starting, means automatically responsive to rotation of the motor in the other direction to connect the motor to the pump for pumping, a switch in said circuit manually operable to make the circuit for rotating the motor in the starting direction and automatically returnable to its normal position to permit the making of the circuit therethrough for rotating the motor in the pumping direction.

2. Automotive apparatus comprising, in combination, an internal combustion engine, an electric circuit including an electric motor, a pump, a storage tank for said pump, means responsive to rotation of the motor in the one direction to connect the motor to the engine for starting, means responsive to rotation of the motor in the other direction to connect the motor to the pump for pumping, a switch normally in position to permit a circuit therethrough in pumping direction and manually operable to make the circuit for rotating the motor in the starting direction, a second switch responsive to pressure in said tank to make and break the circuit for pumping.

3. Automotive apparatus comprising, in combination, an internal combustion engine, an electric motor, means automatically responsive to rotation of the motor in one direction to couple the motor with the engine for starting, a pump, means automatically responsive to the rotation of the motor in the opposite direction to couple the motor with the pump for pumping, an electric circuit including said motor, a switch in said circuit normally in position to permit a circuit therethrough in pumping direction and operable to reverse the circuit through the motor to cause the motor to rotate in one direction for starting, a second switch in said circuit operable to make the circuit through the motor to cause the motor to operate in the opposite direction for pumping.

4. Automotive apparatus comprising, in combination, an internal combustion engine, an electric motor, means automatically responsive to rotation of the motor in one direction to couple the motor with the engine for starting, a pump, means automatically responsive to the rotation of the motor in the opposite direction to couple the motor with the pump for pumping, an electric circuit including said motor, a switch in said circuit operable to make the circuit through the motor to cause the motor to rotate in one direction for starting, a second switch in said circuit operable to make the circuit through the motor to cause the motor to operate in the opposite direction for pumping, said second switch being operable to make said circuit through the motor for pumping only when the first named switch is in a determined position.

5. Automotive apparatus comprising, in combination, an internal combustion engine, an electric motor, means automatically responsive to rotation of the motor in one direction to couple the motor with the engine for starting, a pump, means automatically responsive to the rotation of the motor in the opposite direction to couple the motor with the pump for pumping, an electric circuit including said motor, a switch in said circuit operable to make the circuit through the motor to cause the motor to rotate in one direction for starting, a second switch in said circuit operable to make the circuit through the motor to cause the motor to operate in the opposite direction for pumping, said second switch being operable to make said circuit through the motor for pumping only when the first named switch is open.

6. Automotive apparatus comprising, in combination, an internal combustion engine, an electric motor, means automatically responsive to rotation of the motor in one direction to couple the motor with the engine for starting, a pump, means automatically responsive to the rotation of the motor in the opposite direction to couple the motor with the pump for pumping, an electric circuit including said motor, a switch in said circuit operable to make the circuit through the motor to cause the motor to rotate in one direction for starting, a second switch in said circuit operable to make the circuit through the motor to cause the motor to operate in the opposite direction for pumping said second switch being movable irrespective of the position of the first named switch but being inoperative to make the circuit through the motor for pumping except when the first named switch is open.

7. Automotive apparatus comprising, in combination, an internal combustion engine, an electric motor, means automatically responsive to rotation of the motor in one direction to couple the motor with the engine for starting, a pump, means automatically responsive to the rotation of the motor in the opposite direction to couple the motor with the pump for pumping, an electric circuit including said motor, a switch in said circuit operable to make the circuit through the motor to cause the motor to rotate in one direction for starting, a second switch in said circuit operable to make the circuit through the motor to cause the motor to operate in the opposite direction for pumping, said second switch being operable to make said circuit through the motor for pumping only when the first named switch is in a determined position and in part through said first named switch.

8. Automotive apparatus comprising, in combination, an internal combustion engine, an electric motor, means automatically responsive to rotation of the motor in one direction to couple the motor with the engine for starting, a pump, means automatically responsive to the rotation of the motor in the opposite direction to couple the motor with the pump for pumping, an electric circuit including said motor, a pressure storage tank communicating with said pump, a switch in said circuit normally in position to permit a circuit therethrough and through the motor for pumping and manually operable to make the circuit through the motor for starting, a second switch in said circuit responsive to the pressure in the tank and operable to make the circuit through the motor for pumping.

9. Automotive apparatus comprising, in combination, an internal combustion engine, an electric motor, means automatically responsive to rotation of the motor in one direction to couple the motor with the engine for starting, a pump, means automatically responsive to the rotation of the motor in the opposite direction to couple the motor with the pump for pumping, an electric circuit including said motor, a pressure storage tank communicating with said pump, a normally open switch in said circuit manually operable to make the circuit through the motor for starting, a second switch in said circuit responsive to a determined pressure in said tank to be held normally open and automatically responsive to a fall in pressure in said tank below a determined limit to close the circuit through the motor for pumping but only when said starting switch is open.

10. Automotive apparatus comprising, in combination, an internal combustion engine, an electric motor, means automatically responsive to rotation of the motor in one direction to couple the motor with the engine for starting, a pump, means automatically responsive to the rotation of the motor in the opposite direction to couple the motor with the pump for pumping, an electric circuit including said motor, a pair of switches in said circuit, one switch being operable regardless of the position of the other switch to make said circuit through the motor for starting, the other switch being operable to make the circuit through the motor for pumping but only when the first switch is in a determined position.

In testimony whereof, I, VINCENT G. APPLE, sign this specification.

VINCENT G. APPLE.